United States Patent [19]

Kuss

[11] Patent Number: 5,073,398
[45] Date of Patent: * Dec. 17, 1991

[54] NATURAL FLAVORED VEGETABLE OIL

[75] Inventor: George Kuss, Memphis, Tenn.

[73] Assignee: Kraft General Foods, Glenview, Ill.

[ * ] Notice: The portion of the term of this patent subsequent to Sep. 12, 2006 has been disclaimed.

[21] Appl. No.: 580,335

[22] Filed: Sep. 10, 1990

[51] Int. Cl.$^5$ .......................... A23D 9/00; A23L 1/221
[52] U.S. Cl. ..................................... 426/613; 426/387; 426/417; 426/650
[58] Field of Search ............... 426/613, 386, 387, 650, 426/651, 417

[56] References Cited

U.S. PATENT DOCUMENTS

| | | | |
|---|---|---|---|
| 3,152,914 | 10/1964 | Taylor | 426/613 |
| 3,348,954 | 10/1967 | Green | 426/613 |
| 3,394,013 | 7/1968 | Dirks et al. | 426/613 X |
| 3,433,649 | 3/1969 | Cooke et al. | 426/613 |
| 3,480,446 | 11/1969 | Hollenbeck | 426/602 |
| 4,571,342 | 2/1986 | Di Cicca et al. | 426/533 |
| 4,865,868 | 9/1989 | Kuss | 426/613 |

FOREIGN PATENT DOCUMENTS 571228 8/1966 U.S.S.R. .

Primary Examiner—Donald E. Czaj
Assistant Examiner—John C. Mowbray
Attorney, Agent, or Firm—Thomas A. Marcoux; Thomas R. Savoie; Linn I. Grim

[57] ABSTRACT

A method for treating vegetable oil to provide the natural flavor of peanut oil, olive oil an sesame oil is provided. In the method, a natural flavored oil is heated to a temperature of at least about 150° F. An inert gas is conducted through the oil while maintaining the oil at a natural flavor volatilization temperature of at least about 150° F. to provide an inert gas flavorant stream containing natural volatile flavor components. A vegetable oil is provided at a temperature less than the natural flavor volatilization temperature. The inert gas flavorant stream is conducted through the vegetable oil while maintaining the vegetable oil at a temperature less than the volatilization temperature of the flavored oil so as to deposit natural flavorant components in the vegetable oil to provide a vegetable oil having the derived natural flavor.

8 Claims, 2 Drawing Sheets

NATURAL FLAVORED VEGETABLE OIL

BACKGROUND OF THE INVENTION

The present invention relates to vegetable oil having natural flavors from another desirable oil, such as peanut, olive or sesame imparted to the vegetable oil. More particularly, the invention relates to the method of making these naturally flavored oils.

Vegetable oil compositions, which may be partially hydrogenated, have been used for deep fat frying of foods or for coating or spraying of precooked foods such as bakery goods, crackers and potato snacks. Vegetable oils are preferable over animal fats, such as beef tallow, due to lower cholesterol and reduced fatty acids in the vegetable oils. However, the vegetable oils typically lack the desirable flavor of animal oils and other more expensive oils such as peanut, olive and sesame.

The prior art has recognized the shortfall in vegetable oils in regard to meat flavors. U.S. Pat. No. 4,169,901 to Kravis provides artificial meaty flavors to vegetable oils while U.S. Pat. No. 4,865,868 to Kuss provides natural meaty flavors, from beef tallow, to a vegetable oil composition. These patents make no suggestion for imparting desirable natural flavors from another oil, such as peanut, olive or sesame to an inexpensive oil, such as cottonseed or soybean.

It would be desirable to impart natural volatile flavors from desirable oils, such as peanut oil, olive oil and sesame oil, to an inexpensive oil. Accordingly, it is an object of the present invention to provide such a method. It is a further object to provide edible vegetable oils or shortenings which have the natural flavor of a more expensive and desirable oil, such as peanut, olive or sesame.

SUMMARY OF THE INVENTION

In accordance with this invention, a method is provided for treating vegetable oil to provide a natural flavor of another oil comprising the steps of providing a natural first oil having a desired flavor, heating said oil to a temperature of at least about 150° F., conducting an inert gas through said oil while maintaining the oil at a natural flavor volatilization temperature of at least about 150° F. to provide an inert gas flavorant stream containing natural volatile flavor components, providing a second vegetable oil at a temperature less than said natural flavor volatilization temperature, conducting said inert gas flavorant stream through said second vegetable oil while maintaining said vegetable oil at a temperature less than said volatilization temperature of said first oil to deposit natural flavorant components in said second vegetable oil to provide a vegetable oil which has natural flavor volatiles from said first oil.

Oils having a desired flavor include peanut, olive, sesame, walnut, pecan and chocolate (cocoa). Preferred vegetable oils to be flavored by this process include cottonseed, soybean and mixtures thereof.

DETAILED DESCRIPTION OF THE INVENTION

Figure 1:
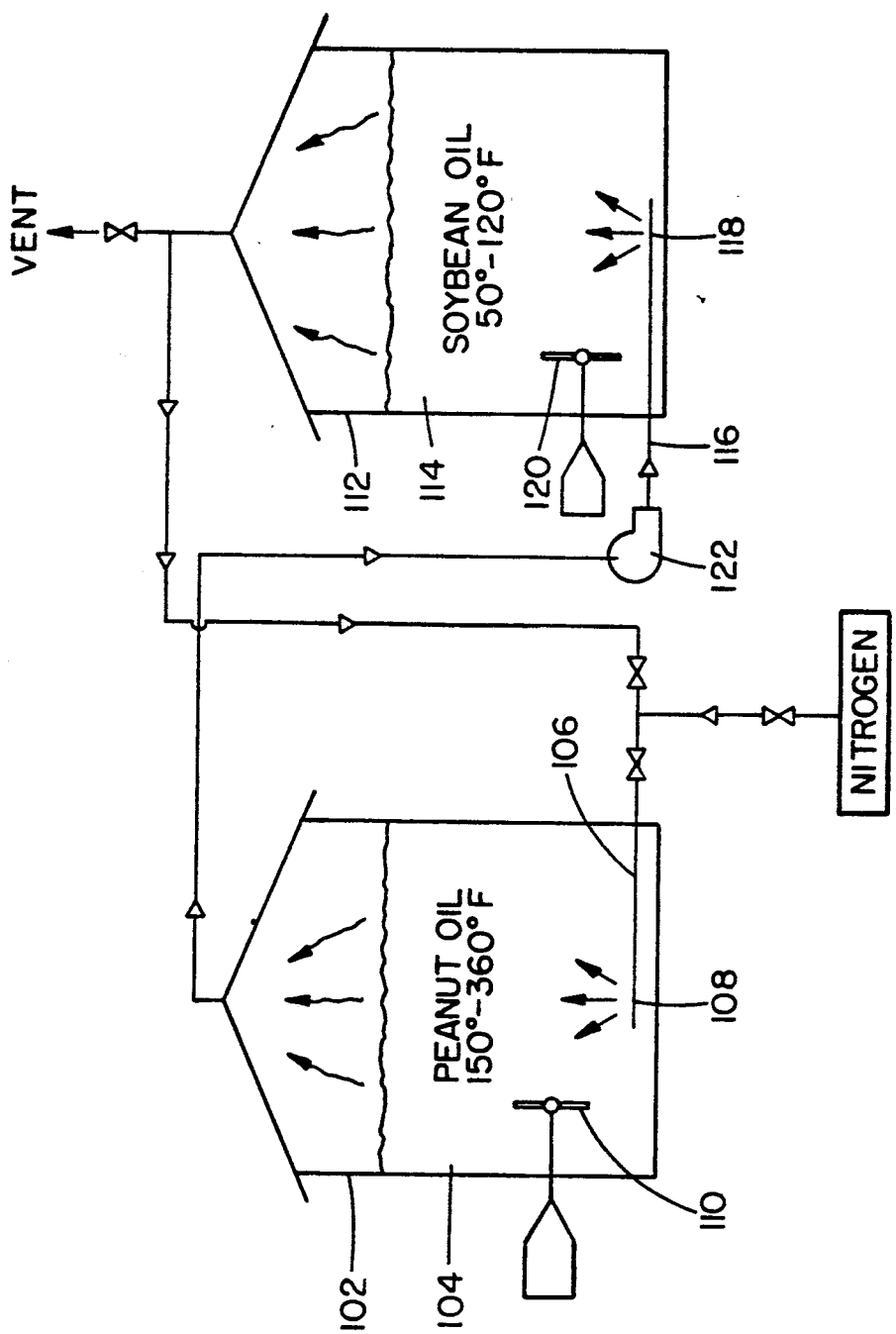
FIG. 1 is an illustration of laboratory scale equipment for preparing natural flavored vegetable oil shortenings suitable for imparting said flavor to foods, in accordance with an embodiment of the present invention.

Generally in accordance with the present invention, methods are provided for preparing naturally flavored edible shortenings which are able to impart these flavors to foodstuffs fried therein, or sprayed or coated therewith.

In accordance with various aspects of such methods, volatile natural flavor components are transferred by means of an inert gas from a flavorant oil maintained at an elevated temperature to a flavor recipient edible shortening maintained at a temperature less than that of the flavorant oil.

The flavorant oil provided as a source of volatile flavor components is heated to an elevated temperature which is preferably at least about 150° F. and preferably is in the range of from about 175° F. to about 220° F. Higher temperatures up to about 360° F. may be used to increase volatilization rate and shorten flavor transfer time. However, such higher temperatures may alter the delicate flavor components or component distribution which may be undesirable in some uses or products. The lower preferred temperature range of 175°-220° F. generally provides the highest quality product in terms of delicacy and quality of flavor. An inert gas is conducted through the volatile flavor source while maintaining it at an elevated temperature of at least about 150° F. to provide an inert gas stream containing volatilized flavor components from the flavor source. The inert gas may preferably be selected from the group consisting of nitrogen, helium, argon, carbon dioxide and mixtures thereof. It is desirable that the inert gas, such as carbon dioxide, nitrogen, argon, helium or mixtures thereof be substantially oxygen free, and that the oil be deoxygenated prior to being heated to elevated temperature for inert gas stripping. Under selected operating conditions, water vapor (steam) alone or in admixture with other inert gases may also be used as an inert volatile flavor transfer gas. The inert gas should best be intimately dispersed in the flavorant oil to maximize the surface area to volume ratio of the gas-flavor contact area. The flavorant oil may also be sprayed or misted through a body of the gas in order to achieve a high contact surface area ratio for the conduction of inert gas through the flavorant oil. The contact time of the gas with the flavorant oil should best be sufficient to approach equilibrium distribution of desired flavor volatile components between the inert gas and the flavorant oil. The effective contact time may be increased by small gas bubble size, agitation of the liquid meat fat, the use of an inert solid surface to mediate gas/liquid contact and/or countercurrent contacting techniques. The inert gas may desirably be conducted under atmospheric pressure conditions (e.g., in the range of 14–20 psia), but may also be conducted therethrough under reduced pressure conditions (e.g., 10–14 psia). Higher pressures may be used (e.g., up to 55 psia or more) but are not particularly advantageous.

Further in accordance with the present invention, a vegetable oil shortening composition is also provided to receive the flavor components. The methods have particular applicability to vegetable oil shortening compositions selected from cottonseed oil, corn oil, soybean oil, safflower oil, sunflower seed oil, rapeseed (canola), and other edible oilseed oils, and mixtures thereof.

In accordance with various aspects of the present method, the vegetable oil shortening composition is provided at a temperature less than the temperature of the flavorant source, which will preferably be less than about 120° F., and desirably at a temperature in the range of from about 50° F. to about 90° F. at which the vegetable oil shortening composition is a liquid.

The edible vegetable oil shortening which is utilized to receive the flavorant components is preferably refined and deodorized. Conventionally, edible vegetable oils such as soybean oil or cottonseed oil which have a characteristically offensive beany flavor, are refined by alkali treatment, bleached and subjected to a deodorization treatment such as by means of steam injection into a hot oil mass under substantial vacuum. Such deodorization treatment produces a relatively bland vegetable oil which is a suitable recipient for the natural flavor components volatilized into the inert gas stream as previously described.

Such natural flavor components are volatile extractives derived from the flavorant oil which provide significant functional flavoring to the vegetable oil shortening at a small concentration. The amount of natural flavor compounds removed from the flavorant compositions and transferred to the vegetable oil composition is typically very small, but the flavor volatile compounds have a significant impact on the organoleptic properties of the vegetable oil shortening compositions to which they are transferred.

The edible vegetable oil preferably comprises at least 95% by weight of triglycerides having acyl groups (fatty acid moieties) predominantly in the range of from 16 to 22 carbon atoms. Such vegetable fats may additionally contain minor amounts (e.g., up to 5% by weight) of mono-and diglycerides, free fatty acids, fat-soluble vitamins and other components. However, the degree of unsaturation of the base fat should preferably be controlled such as by fractionation, transesterification, hydrogenation or combinations thereof, for example, such that the Iodine Value (or "I.V.") is at least about 50 and preferably in the range of from about 50 to about 120, typically and most preferably from about 90 to about 110. Preferred vegetable oils are sufficiently plastic at room temperatures for pumping or ladling, while being resistant to rapid rancidification by oxidative degradation of the unsaturated double bonds.

Preferably, the vegetable oil compositions will be fluid at ambient temperatures (e.g., 60°-80° F.). Preferred polyunsaturated triglycerides which are fluid at ambient temperature include soybean oil, cottonseed oil, safflower oil, canola oil and sunflower seed oil. The weight/weight ratio of flavorant oil utilized in the method to vegetable oil shortening composition to be treated should desirably be in the range of from about 4:1 to about 1:4.

Also in accordance with the present method, the inert gas which has been conducted through the flavorant oil at elevated temperature is subsequently conducted through the vegetable oil shortening composition at a temperature of less than the temperature of the flavorant oil, and preferably in the range of from about 50° to about 120° F. at which the vegetable oil component is a liquid. The inert gas and volatilized flavorant components contained therein are best intimately dispersed with the vegetable oil composition as previously described in respect to the conduction of the gas through the flavorant oil. At least a portion of the natural flavorants are deposited in the vegetable oil composition in this manner. The inert gas flavor transfer treatment will be carried out until a desired flavor level is reached which may take at least two hours in batch methods.

Vegetable oil compositions prepared in accordance with such methods may provide shortening compositions which have a natural flavor, and which impart such natural flavor to food products in which such shortening compositions are incorporated. Such naturally flavored vegetable oil compositions have particular utility in the preparation of prebaked food products, such as crackers, bakery goods and potato products in which the products are sprayed or coated with such natural flavor vegetable oil shortening compositions after baking of the products, and which are not further cooked or baked. Such sprayed or coated prebaked products may be provided which have a delicate natural flavor without incorporation of cholesterol or significant fully saturated fatty ester food components into the food product.

Having generally described the invention, various additional aspects of the invention will be further described with respect to specific embodiments and processing apparatus. In this regard, batch processing apparatus such as that illustrated in FIG. 1 may be used to prepare flavored vegetable oil shortening compositions. Flavorant oil such as peanut oil, may be loaded into tank 102 and heated to approximately 150°-360° F. Deodorized vegetable oil 114 to be treated, such as partially hydrogenated soybean oil having an Iodine Value of about 95, is loaded into tank 112 and the temperature adjusted to 150°-120° F. The tank 112 may similarly be provided with a gas inlet pipe 116 having a gas sparking head 118 and impeller 120.

Nitrogen will be bubbled through the peanut oil in tank 102 and passed through the vegetable oil in tank 112. The gas stream will carry some of the peanut flavor components from the relatively hot peanut oil in tank 102 into the relatively cool vegetable oil in tank 112.

To conserve nitrogen, once the system has been purged of air, the external source of nitrogen may be shut off, and the nitrogen atmosphere within the system may be circulated by means of a gas pump (or compressor) 122.

Circulation of the inert gas will continue and the vegetable oil flavor may be evaluated periodically (every few hours) until a satisfactory "peanut" flavor is observed. The "peanut" flavored vegetable oil is then ready for use. The peanut oil from tank 102 may subsequently be processed in the same fashion as vegetable oil (refined, bleached and deodorized).

Other desired flavorant oils may be substituted for the peanut oil. These include olive, sesame, walnut, pecan and cocoa. The flavor and odor imparted to the vegetable oil diminishes in intensity when exposed to high temperature storage conditions. The oil may subsequently revert to a vegetable or even undesirable beany flavor typical of vegetable oil without the natural flavoring. The development of a vegetable or beany aftertaste of the treated oil may be allayed if the oil is first heat treated at an elevated temperature (e.g., 180° F.) for a suitable period of time (e.g., seven days) prior to "flavorization".

Figure 2:
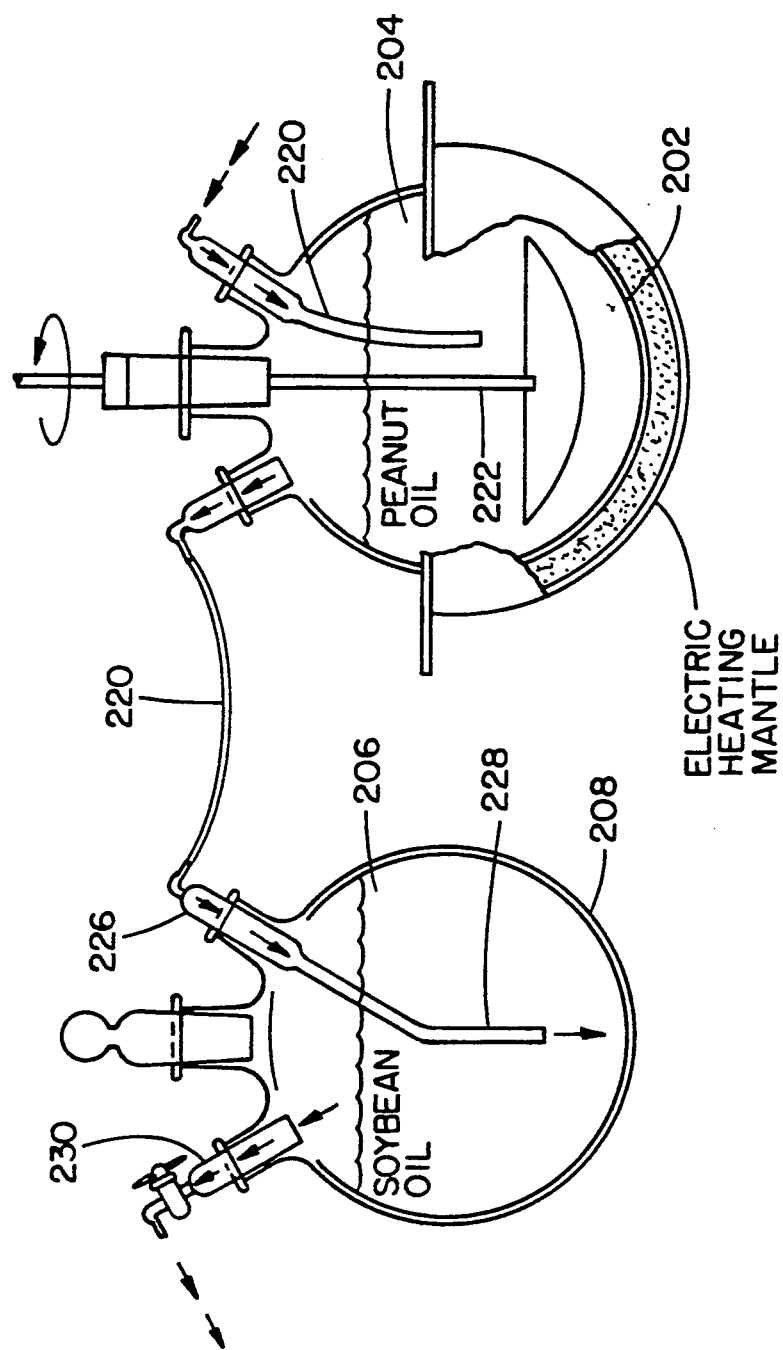
FIG. 2 is a schematic illustration of plant scale process equipment which may be utilized in carrying out batch processing embodiments of a method in accordance with the present invention.

Various aspects of the present invention will now be more particularly described with respect to specific preparations made using apparatus of the type illustrated in FIG. 2.

EXAMPLE 1

Measured portions of refined, bleached, deodorized and partially hydrogenated soybean oil having an Iodine Value of about 95, and peanut oil were loaded into the respective laboratory vessels 202, 208 as shown in FIG. 2. Nitrogen gas was continuously forced into the vessel containing peanut oil. High speed constant agitation was maintained within the vessel 202 to assist in dispersing the nitrogen gas throughout the peanut oil. The gas in peanut oil vessel 202 was vented via internal pressure into the vessel 208 containing the soybean oil and allowed to bubble through the oil.

In this regard, into vessel 202, 1150 grams of peanut oil 204 were placed. Similarly, 1150 grams of the refined, bleached and deodorized soybean oil 206 were loaded into the vessel 208. A continuous and steady flow of pure nitrogen gas (at approximately 5 psig) was introduced into the system via a glass inlet tube 220. This gas was bubbled through the peanut oil 204 in vessel 202 which was heated to and maintained at 180° F. by means of a heating mantle, as shown in FIG. 1. Additional gas dispersion within the peanut oil was accomplished by high speed continuous paddle agitation provided by rotary stirring system 222. The gas escaping from the peanut oil was then directed away from the vessel 202 and into vessel 208 via the illustrated glass tubing 224. Upon entering vessel 208, the "peanut-flavored" nitrogen was bubbled through the soybean oil contained therein by means of tube 228 and projecting below the surface of the oil 206 and was maintained at room temperature (approximately 75° F.) via fitting 230.

This treatment process was maintained under the aforementioned conditions for 40 minutes after which the hydrogenated soybean oil was tested for odor and flavor. Odor was "peanut like" to a moderate degree as was also the flavor of the oil. The treated sample was placed in a covered container and stored for five days and again evaluated indicating a flavor and odor of reduced intensity.

Another portion of the partially hydrogenated soybean oil was treated as described hereinabove employing similar temperature and gas flow conditions. However, 3.5% of distilled water, as calculated based on the total peanut oil weight, was added to vessel 202 to determine if a more enriched flavor would be produced through the action of water vapor. The charge in vessel 202 was heated to 220° F. with high speed agitation whereupon the added water boiled away being condensed and captured in vessel 208 in which the charge was maintained at 75° F. This process was continued for 40 minutes. The treated soybean oil was then laboratory dried at 220° F. with $N_2$ purge and lowered to 100° F. while continuing the gas purge. The oil was then tested for flavor and odor and found to possess a rich peanut taste and smell.

2000 grams of the partially hydrogenated soybean oil contained in an open top stainless steel beaker were placed into a laboratory oven and maintained at 180° F. for a period of seven days. This was done to develop a lasting buttery flavor. 1150 grams of this heat-treated soybean oil was placed into vessel 208 and maintained at approximately 75° F. Fresh crude peanut oil was loaded into vessel 208 into which a nitrogen purge was begun as before, but without the addition of water to assist in the transfer of volatiles. The peanut oil was subjected to constant high speed agitation and raised to a temperature of 360° F. The total natural peanut flavor transfer time at these conditions was three hours. The treated soybean oil was evaluated and found to possess a strong peanut flavor and odor. The treated sample may be sprayed on prebaked products such as croutons, potato products and baked dough products to provide a shortening coated or misted product having a natural peanut flavor.

EXAMPLE 2

6000 grams of a soy oil blend were placed into a stainless steel 8-liter beaker. The top was covered by 2 layers of plastic film followed by 2 layers of heavy duty aluminum foil. Crude peanut oil was similarly placed in another vessel, with a nitrogen purge utilized similar to that shown in FIG. 1.

Peanut flavored gas from the peanut oil containing vessel directed into the vessel containing the soy blend for 2 hours with each vessel maintaining agitation for dispersion of gas. The temperature of the peanut oil was 200° F. The temperature of the soy blend was 100° F. At the end of the 2 hour gassing period, the soy blend had peanut flavor. The product may be sprayed or misted onto prebaked products having a low shortening content or substantially all vegetable oil content, without further cooking to provide a food product having a natural peanut flavor.

While the present invention has been particularly described with respect to certain specific embodiments, it will be appreciated that various modifications and adaptations will become apparent from the present disclosure and are intended to be included within the scope of the following claims.

What is claimed is:

1. A method for treating vegetable oil to provide a desired natural flavor of another oil comprising the steps of providing a natural first oil having a desired flavor, heating said oil to a temperature of at least about 150° F., conducting an inert gas through said oil while maintaining the oil at a natural flavor volatilization temperature of at least about 150° F. to provide an inert gas flavorant stream containing natural volatile flavor components, providing a second vegetable oil at a temperature less than said natural flavor volatilization temperature, conducting said inert gas flavorant stream through said second vegetable oil while maintaining said vegetable oil at a temperature less than said volatilization temperature of said first oil to deposit natural flavorant components in said second vegetable oil to provide a vegetable oil which has a natural flavor volatiles from said first oil.

2. A method in accordance with claim 1 wherein said volatilization temperature is in the range of from about 175° F. to about 360° F.

3. A method in accordance with claim 1 wherein said volatilization temperature is in the range of from about 175° F. to about 220° F. and wherein said vegetable oil is maintained at a temperature in the range of from about 50° F. to about 120° F. while conducting said inert gas flavorant stream through said vegetable oil.

4. A method in accordance with claim 1 wherein the weight ratio of said first oil to said second oil is in the range of from about 1:4 to about 4:1.

5. A method in accordance with claim 1 wherein said method is a batch process, wherein said inert gas is conducted through said first oil and wherein said inert gas flavorant stream is conducted through said second oil for at least about two hours.

6. A method in accordance with claim 1 wherein the natural first oil is taken from the group consisting of peanut, olive, sesame, walnut, pecan, and cocoa and the second vegetable oil is taken from the group consisting of soybean, cottonseed and mixtures thereof.

7. A method in accordance with claim 1 wherein said inert gas is nitrogen and wherein said first oil is peanut oil and said second oil is a soybean oil having an Iodine Value in the range of from about 90 to about 110.

8. A method in accordance with claim 6 wherein said inert gas is nitrogen and wherein said first oil is peanut oil and said second oil is a cottonseed oil having an Iodine Value in the range from about 90 to about 110.

* * * * *